United States Patent
Bur

[11] 3,714,537
[45] Jan. 30, 1973

[54] LIMIT CONTROL APPARATUS
[75] Inventor: Philip W. Bur, Warminster, Pa.
[73] Assignee: Honeywell Inc., Minneapolis, Minn.
[22] Filed: March 27, 1972
[21] Appl. No.: 238,180

[52] U.S. Cl. ................... 318/626, 318/286, 318/466
[51] Int. Cl. ............................................. G05g 5/00
[58] Field of Search ...... 318/626, 627, 282, 207, 466, 318/286

[56] References Cited

UNITED STATES PATENTS

| | | | |
|---|---|---|---|
| 2,648,040 | 8/1953 | Schneider | 318/286 |
| 2,815,476 | 12/1957 | Chesson | 318/626 |
| 2,825,017 | 2/1958 | Cunningham | 318/626 |
| 2,884,579 | 4/1959 | Kaltenbach | 318/207 E |
| 3,327,118 | 6/1967 | Nagami et al | 250/83.3 R |

*Primary Examiner*—Benjamin Dobeck
*Attorney*—Arthur H. Swanson et al.

[57] ABSTRACT

A servo system includes a servo motor which drives a controlled member. The controlled member has a slider and actuating members thereon. The slider moves across a slide-wire and provides a feedback signal representative of the position of the controlled member. An amplifier receives an input signal, representative of a process variable, and the feedback signal, and generates a difference signal, representative of the difference therebetween, for driving the servo motor. The actuating members trip limit switches as the controlled member reaches predetermined limits of travel. The limit switches are serially connected in the servo motor circuit and each is shunted by a diode. The diode allows a difference signal to be applied to the servo motor after its associated limit switch has been tripped, only if the difference signal is of a polarity which would effect the movement of the controlled member away from the tripped limit switch.

8 Claims, 2 Drawing Figures

PATENTED JAN 30 1973                                      3,714,537

LIMIT CONTROL APPARATUS

The present invention relates generally to control circuits, and more particularly to a limit control circuit for use in a servo system.

The use of a servo system to move a controlled member or indicator to a position representative of a detected value of a monitored process variable is generally well known in the art. Problems have arisen, however, when the detected value of a monitored process variable exceeds predetermined limits of travel of the controlled member. In some prior art systems, a mechanical stop was mounted at the predetermined limits of travel to physically prevent the controlled indicator from going off-scale. That quasi-solution had the disadvantage that the servo motor would consume unnecessary power while trying to move the controlled member past the mechanical stop in response to a detected off-scale value of a measured variable. In worm-type feedscrew drive devices, the further disadvantage of "jamming" was encountered. Jamming occurs when, in response to a detected off-scale value, the feedscrew continues to drive the controlled member after the controlled member has reached the mechanical stop. The driving threads of the lead screw would effectively lock or jam the controlled member against the mechanical stop. Thereafter, excessive energy would be required to unlock the controlled member from the mechanical stop before the controlled member could be moved in the opposite direction. In many cases, the jamming is so severe that the servo system is unable to overcome the jamming force and the system is rendered inoperative. Further disadvantages of strain, vibration and mechanical wear were also apparent in prior art devices. Other prior art systems utilized limit switches in combination with complicated control circuitry, including a plurality of relays, to overcome the overshoot and jamming problems. In those systems, the reliability of the circuit was sacrificed, since the many additional circuit elements and relays included in the control circuit increased the probability of a system failure.

It is, accordingly, an object of the present invention to provide a limit control circuit which obviates the disadvantages of prior art apparatus.

Is is another object of the present invention to provide a limit control circuitry which substantially precludes the consumption of wasted power.

It is still another object of the present invention to provide a limit control circuit which precludes the possibility of jamming.

It is a further object of the present invention to provide a limit control circuit as set forth which is simple in design and construction and which employs a minimal number of component parts.

In accomplishing these and other objects, there has been provided, in accordance with the present invention, an improved limit control circuit in which a switching means cooperates with a controlled member, operated by a servo motor, to effectively open the servo motor power circuit, when a predetermined limit of travel is reached by the controlled member while moving in one direction, while maintaining a circuit effective to apply only subsequent signals which are operative to move the controlled member in the opposite direction.

A better understanding of the present invention may be had, from the following detailed description, when read in connection with the accompanying drawings in which.

Figure 1:
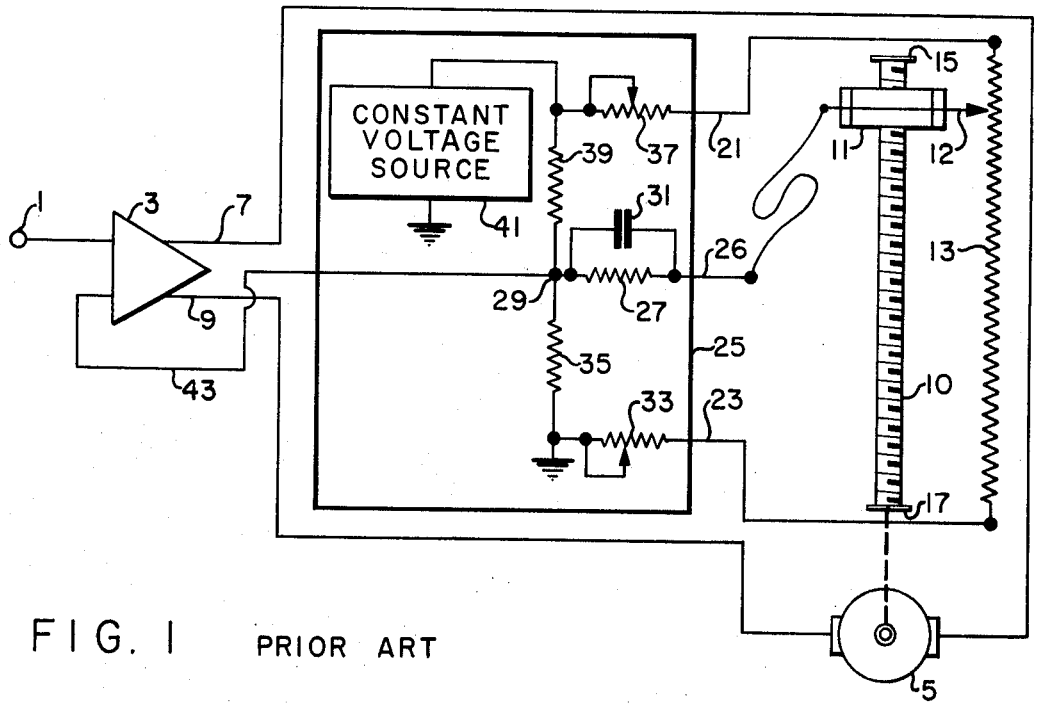
FIG. 1 is a schematic diagram of a prior art servo system.

Referring to FIG. 1 in detail, an input terminal 1 is arranged to receive a signal representative of the value of a process variable being monitored. The input terminal 1 is connected to one input terminal of an amplifier 3. A control or difference signal from the output of the amplifier 3 is applied to a servo motor 5 through conductors 7 and 9. The servo motor 5 is coupled to, and drives, a worm-type feedscrew 10. A controlled member 11 has a slider 12 mounted thereon, which moves across a slidewire 13. Mechanical stops 15 and 17 are positioned at the limits of the feedscrew 10 to preclude the controlled member 11 from venturing therepast. Wires 21 and 23 connect the extremities of the slidewire 13 to a measuring circuit 25. A wire 26 connects the slider 12 to the measuring circuit 25. The measuring circuit 25 in the present example includes a resistor 27 which connects the wire 26 to a common point 29. A capacitor 31 is connected across the resistor 27. A variable resistor 33 connects the wire 23 to a ground reference point which is, in turn, connected to the common point 29 through a resistor 35. A series combination of a variable resistor 37 and another resistor 39 connects the wire 21 to the common point 29. The common junction of the series connected resistors 37 and 39 is connected to a ground reference point through a constant voltage source 41. The common point 29 serves an an output terminal of the measuring circuit 25 and provides a feedback signal which is fed back to the amplifier 3 by means of a conductor 43.

Initially assuming a steady-state condition, the value of an input signal applied to the input terminal 1 will be relatively constant and equal to the value of the feedback signal. Since both input signals to the amplifier 3 are equal, no control or difference signal will appear between the leads 7 and 9; the servo motor 5 will be inactivated. If the value of the input signal either increases or decreases, a control or difference signal will be generated by the amplifier 3 and applied to the motor 5 through the leads 7 and 9. Assuming that the value of the input signal increases, the polarity of the control or difference signal applied to the motor will cause the motor to rotate the feedscrew in a predetermined direction. The controlled member 11, which rides on the threads of the feedscrew 10, will then begin to move toward the stop 15 in response to the rotation of the feedscrew 10. As the controlled member 11 moves toward the stop 15, the slider 12 moves along the slidewire 13. The constant voltage source 41 applies a constant voltage across the slidewire 13. As the slide moves upwardly along the slidewire 13, the potential difference between the conductors 21 and 26 will decrease and the voltage at the common point 29 will increase toward the output voltage of the constant voltage source.

Therefore, as the controlled member 11 moves toward the stop 15, the value of the feedback signal applied to the amplifier 3 through the lead 43 will increase. When the value of the feedback signal is equal to the value of the input signal, no control signal will be generated by the amplifier 3 and the motor 5 will cease to drive the feedscrew 10 thereby terminating the movement of the controlled member 11. Similarly, when the value of the input signal decreases, the controlled member will move toward the stop 17 until the value of the feedback signal and the input signal are again equal. Therefore, in a steady state condition, the position of the controlled member is representative of the value of the input signal. An indicator is usually coupled to the controlled member to indicate that value on an associated scale means. In the past, when the input signal appearing at the terminal 1 represented a position of the controlled member 11 beyond the limit stops 15 and 17, the controlled member 11 would be jammed into the limit stops 15 and 17 after which time the servo motor 5 would become stalled and consume an excessive amount of power until the value of the input signal decreased to a value representative of a position between the limit stops 15 and 17. The circuit of FIG. 2 overcomes that shortening among others.

Figure 2:
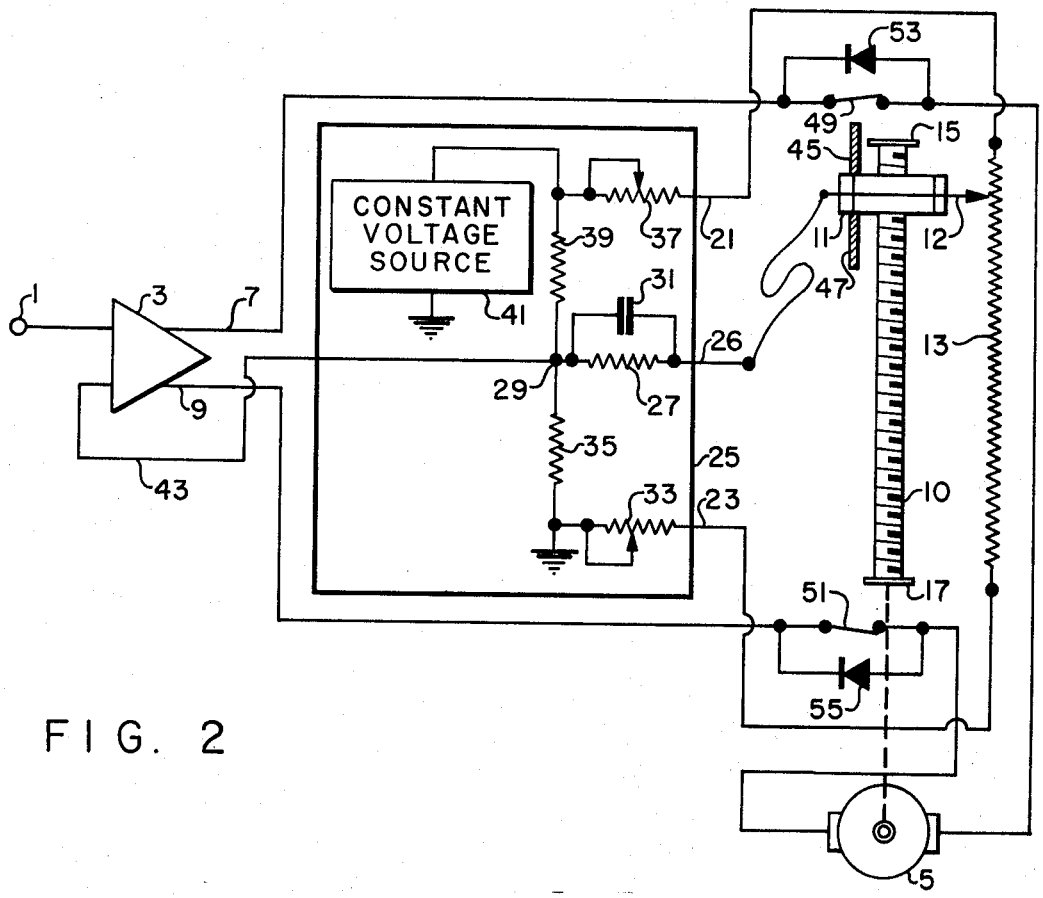
FIG. 2 is a schematic diagram of an embodiment of the present invention.

In FIG. 2, elements corresponding to those of FIG. 1 are designated with the same identification numerals as shown in FIG. 1. Limit switch actuating members 45 and 47 are mounted on the controlled member 11 but electrically isolated therefrom. As the controlled member 11 reaches the predetermined limits 15 or 17, the actuating members 45 or 47 open limit switches 49 or 51, respectively. The limit switches 49 and 51 are serially connected in the servo motor power circuit conductors 7 and 9, respectively. The limit switches 49 and 51 are biased closed when not engaged by the actuating members 45 and 47. Assymetrically conducting means or diodes 53 and 55 are connected across the limit switches 49 and 51, respectively. Each of the two diodes 35 and 37 has its anode terminal connected to the servo motor side of the limit switch across which it is connected.

The operation of the circuit of FIG. 2 is similar to that of FIG. 1 insofar as the servo operation itself is concerned. When the value of the input signal appearing at the terminal 1 is indicative of a position of the controlled member 11 which is beyond the predetermined limit 15 for example, the servo motor 5 will effect the movement of the controlled member 11 to the predetermined limit or stop 15 at which time the limit switch 49 will be opened by the actuating member 45. When the limit switch 49 is opened, the current flow from conductor 7 to conductor 9 is interrupted and the servo motor 5 is disabled from further moving the controlled member 11 in the upward direction. The inclusion of the limit switches 49 and 51 therefore, stop the movement of the controlled member 11 at predetermined limits and preclude the possibility of controlled member becoming jammed against a limit stop. After the limit switch 49 is opened by the actuating member 45, a subsequent "reverse" current flow from conductor 9 to conductor 7, resulting from a change in the polarity of the control signal between the conductors 7 and 9, is allowed to bypass the open limit switch 49 by means of the diode 53. The controlled member 11 will then "back out" from the open limit switch 49. As the actuating member 45 backs out from the limit switch 49, the limit switch 49 returns to its normally closed position. The operation of the limit switch 51 and the diode 55 is similar to that of the limit switch 49 and the diode 53. Although the limit switches are shown as being operated by actuating members on the controlled member, it is understood that the limit switches could be operated directly from the motor shaft or another shaft in geared arrangement therewith. Further, although conventional limit switches are shown in the drawings, it is noted that any controllable symmetrically conducting device, i.e., capable of being "opened" and "closed," providing an open circuit when opened and conducting equally well in either direction when closed, may be substituted therefor without departing from the spirit of the invention.

Thus, there has been provided, in accordance with the present invention, an improved limit control circuit which is jam proof, and precludes the consumption of wasted power while being simple in design and construction, and using a minimal number of component parts.

The embodiments of the invention in which an exclusive property or privilege is claimed are defined as follows:

1. In a servo system wherein a servo motor responds to first and second polarities of a control signal for moving a controlled member in first and second directions, respectively, between first and second limit positions. The combination comprising:
   a power circuit for applying said control signal to said servo motor,
   first switching means serially connected in said power circuit,
   first switch actuating means associated with said controlled member,
   said first switch actuating means being correlated to the movement of said controlled member to actuate said first switching means to a non-conductive condition upon movement of said controlled member to said first limit position, and
   first assymetrically conductive means connected in shunt with said first switching means for passing only control signals of a polarity tending to move said controlled member toward said second limit position.

2. The combination as set forth in claim 1 wherein said first switching means is a first limit switch, said first switch actuating means being a mechanical member mounted on said controlled member for mechanically actuating said first limit switch to said non-conductive condition.

3. The combination as set forth in claim 1 wherein said first assymetrically conduction means is a first diode means.

4. The combination as set forth in claim 1, and further including:
   second switching means serially connected in said power circuit;
   second switch actuating means associated with said controlled member, said second switch actuating means being correlated to the movement of said controlled member to actuate said second switching means to a non-conductive condition upon movement of said controlled member to said second limit position; and second assymetrically conductive means connected in shunt with said second switching means for passing only control signals of a polarity tending to move said controlled member toward said first limit position.

5. The combination as set forth in claim 4 wherein said second switching means is a second limit switch, said second switch actuating means being a mechanical member mounted on said controlled member for mechanically actuating said second limit switch to said non-conductive condition.

6. The combination as set forth in claim 4 wherein said second assymetrically conducting means is a second diode means.

7. A limit control apparatus comprising:
input terminal means for receiving an input signal;
a controlled member;
a servo motor means for driving said controlled member;
a measuring circuit for providing a feedback signal representative of the instantaneous position of said controlled member;
a power means responsive to said input signal and said feedback signal for providing a control signal representative of the difference therebetween;
power circuit for applying said control signal to said servo motor means, said servo motor being responsive to first and second polarities of said control signal for moving said controlled member in first and second directions, respectively, between first and second limit positions;
first switching means serially connected in said power circuit;
first switch actuating means associated with said controlled member, said first switch actuating means being correlated to the movement of said controlled member to actuate said first switching means to a non-conductive condition upon movement of said first controlled member to said first limit position; and
first assymetrically conductive means connected in shunt with said first switching means for passing only control signals of a polarity tending to move said controlled member toward said second limit position.

8. The limit control apparatus as set forth in claim 7, and further including:
second switching means serially connected in said power circuit;
second switch actuating means associated with said controlled member, said second switch actuating means being correlated to the movement of said controlled member to actuate said second switching means to a non-conductive condition upon movement of said controlled member to said second limit position; and
second assymetrically conductive means connected in shunt with said second switching means for passing only control signals of a polarity tending to move said controlled member toward said first limit position.

* * * * *